United States Patent
Michi et al.

(10) Patent No.: US 6,625,571 B1
(45) Date of Patent: Sep. 23, 2003

(54) METHOD FOR EVALUATING SIGNALS WITH THE AID OF A TIMER AND AN OVERRUN COUNTER

(75) Inventors: Harald Michi, Oelbronn-Duerrn (DE); Bernd Lichtenberg, Vaihingen (DE); Michael Rink, Gerlingen (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/868,452
(22) PCT Filed: Dec. 9, 1999
(86) PCT No.: PCT/DE99/03932
§ 371 (c)(1), (2), (4) Date: Aug. 6, 2001
(87) PCT Pub. No.: WO00/37946
PCT Pub. Date: Jun. 29, 2000

(30) Foreign Application Priority Data

Dec. 18, 1998 (DE) .......................... 198 58 536

(51) Int. Cl.$^7$ .......................... G06F 15/00; H03F 15/00
(52) U.S. Cl. .......................... 702/189
(58) Field of Search .......................... 702/189, 127, 702/142, 145, 147; 701/71, 79, 78

(56) References Cited

U.S. PATENT DOCUMENTS

| 4,086,470 A | | 4/1978 | Ashbee | |
|---|---|---|---|---|
| 4,335,431 A | * | 6/1982 | Takahashi | 701/71 |
| 4,566,069 A | | 1/1986 | Hirayama | |
| 4,660,146 A | * | 4/1987 | Kubo | 701/79 |
| 4,680,714 A | * | 7/1987 | Kubo | 701/79 |
| 4,796,208 A | * | 1/1989 | Kumangai et al. | 123/406.61 |
| 4,930,083 A | * | 5/1990 | Hoashi et al. | 701/79 |
| 4,957,329 A | * | 9/1990 | Matsuda | 303/159 |
| 4,985,859 A | | 1/1991 | Rauner | |
| 5,222,022 A | | 6/1993 | Adams | |
| 5,233,292 A | | 8/1993 | Nagata | |
| 5,301,335 A | * | 4/1994 | Langan et al. | 712/218 |
| 5,388,053 A | * | 2/1995 | Kurihara et al. | 702/79 |
| 5,435,635 A | * | 7/1995 | Watanabe | 303/166 |
| 5,498,072 A | * | 3/1996 | Shimizu | 303/191 |
| 5,528,931 A | * | 6/1996 | James et al. | 73/117.3 |
| 5,539,308 A | * | 7/1996 | Teramae et al. | 324/173 |
| 5,729,476 A | * | 3/1998 | Pfau | 702/185 |
| 5,824,890 A | * | 10/1998 | La Palm et al. | 73/117.3 |
| 5,986,485 A | * | 11/1999 | O'Sullivan | 327/156 |
| 6,064,646 A | * | 5/2000 | Shal et al. | 370/212 |
| 6,219,624 B1 | * | 4/2001 | Russ | 702/72 |
| 6,345,234 B1 | * | 2/2002 | Dilger et al. | 702/24 |

FOREIGN PATENT DOCUMENTS

DE 38 21 938 A 1/1990
DE 44 444 08 * 12/1994

* cited by examiner

Primary Examiner—Kamini Shah
Assistant Examiner—Demetrius Pretlow
(74) Attorney, Agent, or Firm—Michael J. Striker

(57) ABSTRACT

A method for signal evaluation, e.g. with pulse wheels, is described, in which the distance between predeterminable signal edges is determined in a microcontroller that has a CPU, timer, and memory, in that upon the occurrence of signal edges, an interrupt is triggered with which the existing timer values are stored. Based on the difference between predeterminable timer values, time intervals are determined which are inversely proportional to the velocity or speed. So that it is possible to use timers with a relatively low bit count, for example 16 bits, the numerical values obtained when there is a timer overflow are also determined and are taken into account in the determination of the distances. If drum stores are used, only four bits per drum store value are required, one check bit and three bits as an overflow counter.

2 Claims, 1 Drawing Sheet

# METHOD FOR EVALUATING SIGNALS WITH THE AID OF A TIMER AND AN OVERRUN COUNTER

BACKGROUND OF THE INVENTION

The invention relates to a method for signal evaluation, in particular for measuring the distances between predeterminable signal edges in the evaluation of speed sensor signals.

In the evaluation of speed sensor signals, it is known that there are limits beneath which a reliable evaluation is no longer possible.

For different applications, for example in antilock control systems (ABS), traction control systems (ASR), and vehicle dynamics control (VDC), it is necessary to know the wheel speeds which are determined with the aid of speed sensors. These speed sensors have pulse wheels which have a predeterminable number of teeth, for example 48, and are connected to the wheel or wheels and/or the associated axles, and rotate along with them. The distance from tooth to tooth of such pulse wheels in terms of the wheel circumference is usually approximately 4 cm. When the pulse wheels are scanned, a pick-up, for example an inductive pick-up, generates an output signal which mirrors the surface of the relevant pulse wheel. After a signal processing, a square-wave signal is produced, which is processed in an associated evaluation device. Usually, the evaluation device includes a microcontroller in which each tooth edge of the pulse wheel and/or each signal edge of the signal triggers an interrupt. By measuring the signal intervals, time intervals are produced in the microcontroller, which are in turn proportional to the speed of the wheel.

A method for determining wheel speeds which operates in accordance with the above-described method has been disclosed, for example, by DE-OS 44 444 08 in connection with an antilock system. In the known method, however, no indication is given as to how it is possible to reduce the lower limit value of the wheel speed which can still be evaluated. Usually, wheel speeds that are lower than 2.75 km/h can no longer be evaluated since at that point, the time intervals between the signal edges become so great (116.5 milliseconds) that they can no longer be evaluated using a conventional 16 bit timer, which can only detect a value range from 0 to 65535. These interrelated factors apply to the normally used sensors with pulse wheels that have 48 teeth and a tooth spacing of 4 cm in terms of the wheel circumference.

SUMMARY OF THE INVENTION

The method according to the invention has the advantage over the prior art that in a signal evaluation, particularly in the evaluation of square-wave signals with the aid of an n-bit timer, a timer can be used which has fewer bits than were originally required. This advantage is achieved by virtue of the fact that a timer, which is limited to a design-contingent number of n bits, is expanded in its function so that it can operate in a manner which would have originally required a greater number of bits.

For example, in the evaluation of the output signal of a speed or velocity sensor, a 16 bit timer can advantageously be used and despite this fact, a limit speed can be achieved for which an 18 bit timer would originally have been required. Advantageously, the missing two bits are retained by means of increased effort in the calculation process of the software of the microcontroller. In this connection, it is advantageous that only a small amount of RAM storage space is required. Through the use of drum stores, only 4 bits per drum store are advantageously required; a check bit and 3 bits as an overflow counter are required.

The advantage to evaluating wheel sensor signals using the method according to the invention is that the lower limit value of the evaluatable wheel speed can be significantly reduced in comparison to conventional systems so that signal evaluations can advantageously be carried out almost down to the point at which the wheel stops. At least in connection with the determination of wheel speeds, it is possible to.reliably execute the speed measurement down to 0.5 km/h.

This advantage is achieved by virtue of the fact that a method for signal evaluation is executed with which the distance between predeterminable signal edges of the signal to be evaluated is determined by virtue of the fact that with the occurrence of signal edges, timer values are stored and the difference between predeterminable timer values is calculated. The method is executed in a microcontroller which has at least one CPU, one n bit timer, a counting mechanism, and a storage mechanism, in particular at least one drum store. The numerical values obtained when there is a timer overflow are likewise determined and are also taken into account in the determination of the distances between the signal edges.

Advantageously, the method for signal evaluation according to the invention is used in conjunction with the determination of wheel speeds in antilock control systems, traction control systems, and/or vehicle dynamics control systems, as a result of which a reduction of the minimal evaluatable speed is achieved in these systems as well. This applies to both the wheel speeds and the vehicle speed determined based on them. In future vehicles which are equipped with longitudinal control systems, e.g. ACC (adaptive cruise control), it is therefore possible to comfortably brake to a stop.

The methods according to the invention can naturally also be used in other systems; their use is particularly advantageous if signals are to be evaluated in which the interval between a first and second event (e.g. between two signal edges) to be evaluated can be greater and if the capacity (bit number) of the timer used should be or is limited.

BRIEF DESCRIPTION OF THE DRAWING

An exemplary embodiment of the invention is shown in the drawings and will be explained in detail in the description that follows.

BRIEF DESCRIPTION OF THE DRAWING

Figure 1:
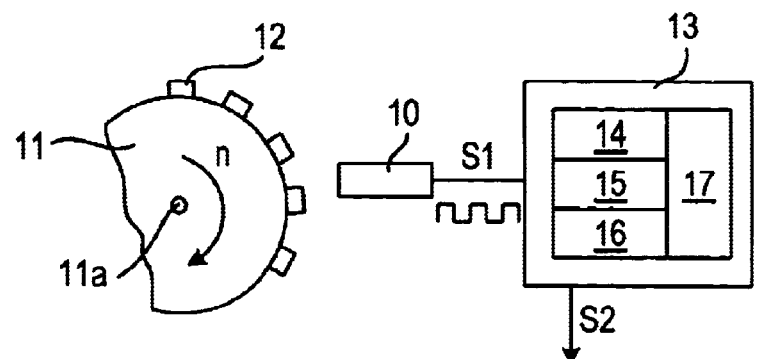
FIG. 1 shows the hardware components in a speed detection unit that are required for comprehension of the invention and FIG. 2 shows a structured chart of the timer value difference monitoring according to the invention.

FIG. 1 schematically depicts the essential components of a device in which the method for signal evaluation according to the invention can be executed. A pick-up, for example an inductive sensor, is provided with the reference numeral 10. This pick-up 10 is stationary-and scans a pulse wheel 11 which is affixed to a shaft 11a and has a number of angle markings 12 on its surface. In the exemplary embodiment, these angle markings 12, which are also referred to as teeth, are all the same and have the same distance from one another. When the shaft 11a and therefore the pulse wheel 11 as well, rotates at the speed n, a signal S1 is produced in the pick-up 10, which reflects the surface of the pulse wheel 11 and, particularly after a suitable processing, exists in the form of a square-wave signal.

The signal S1 is evaluated in an evaluation device 13, for example, a microcontroller, wherein time intervals between predeterminable signal edges are used to produce time values which are proportional to the speed n and are used to calculate the speed.

The microcontroller 13 includes at least one central processor unit CPU 14 and at least one timer 15 for measuring the time intervals between predeterminable signal edges, for example a 16 bit timer, as well as a suitable number of counters 17 and memories 16; for example, at least one memory 16 is a drum store. The connection of these elements in the microcontroller 13 is not shown in detail. The required calculation, storage, and counting events take place in the CPU 14. The signal referred to as signal S2 represents the determined speed or the wheel speed which is either processed by the microcontroller itself or is optionally sent to other evaluation devices or control units which require the speed or wheel speed values.

In vehicles with ABS, ASR, and/or VDC, the wheel speeds and/or the wheel velocities and based on them, also the vehicle speed are usually determined with a system of the kind depicted in FIG. 1. The pulse wheels used usually have 48 angle markings or teeth. The distance from angle marking to angle marking in terms of the wheel circumference is approximately 4 cm in conventional systems. Each signal edge triggered by an angle marking edge of the pulse wheel triggers an interrupt in the microcontroller 13, with which the existing associated timer value present in the timer 15 can be input into the memory 16, e.g. a drum store. The size of the drum store is usually 6 bytes so that as a result, three timer values can be stored in the drum store. In order to determine the unfiltered wheel speed, the difference between the last timer value and the third-to-last timer value is usually calculated; i.e. evaluations are always made of signal edges facing the same direction. The speed is inversely proportional to the time interval between the signal edges. The greater the difference between the timer values, the lower the speed and therefore also the lower the wheel speed.

If a 16 bit timer is used, then a value range from 0 to 65535 can be evaluated; these numbers can be represented with a 16 bit timer of this kind. The maximal possible measurement duration in this value range is therefore 116.5 milliseconds (depending on the frequency used); i.e. evaluations can still be made of signals in which the distance between two edges to be evaluated is 116.5 milliseconds. If the time interval between two signal edges to be evaluated becomes greater than 116.5 milliseconds even at lower speeds, then the 16 bit timer given as an example can still be used only if the method according to the invention is used. In current ABS, ASR, and vehicle dynamics control systems, however, the speed processing is interrupted if the difference between two signal edges to be evaluated approaches the vicinity of 65535 (corresponding to 116.5 milliseconds). As a result, the pulse wheels usually present establish a lower limit speed of 2.75 km/h. In order to reduce this lower limit speed, an 18 bit timer would have to be used; this would lead to an increased hardware cost, which can be avoided through the use of the current invention or with a signal evaluation method according to the invention.

Figure 2:
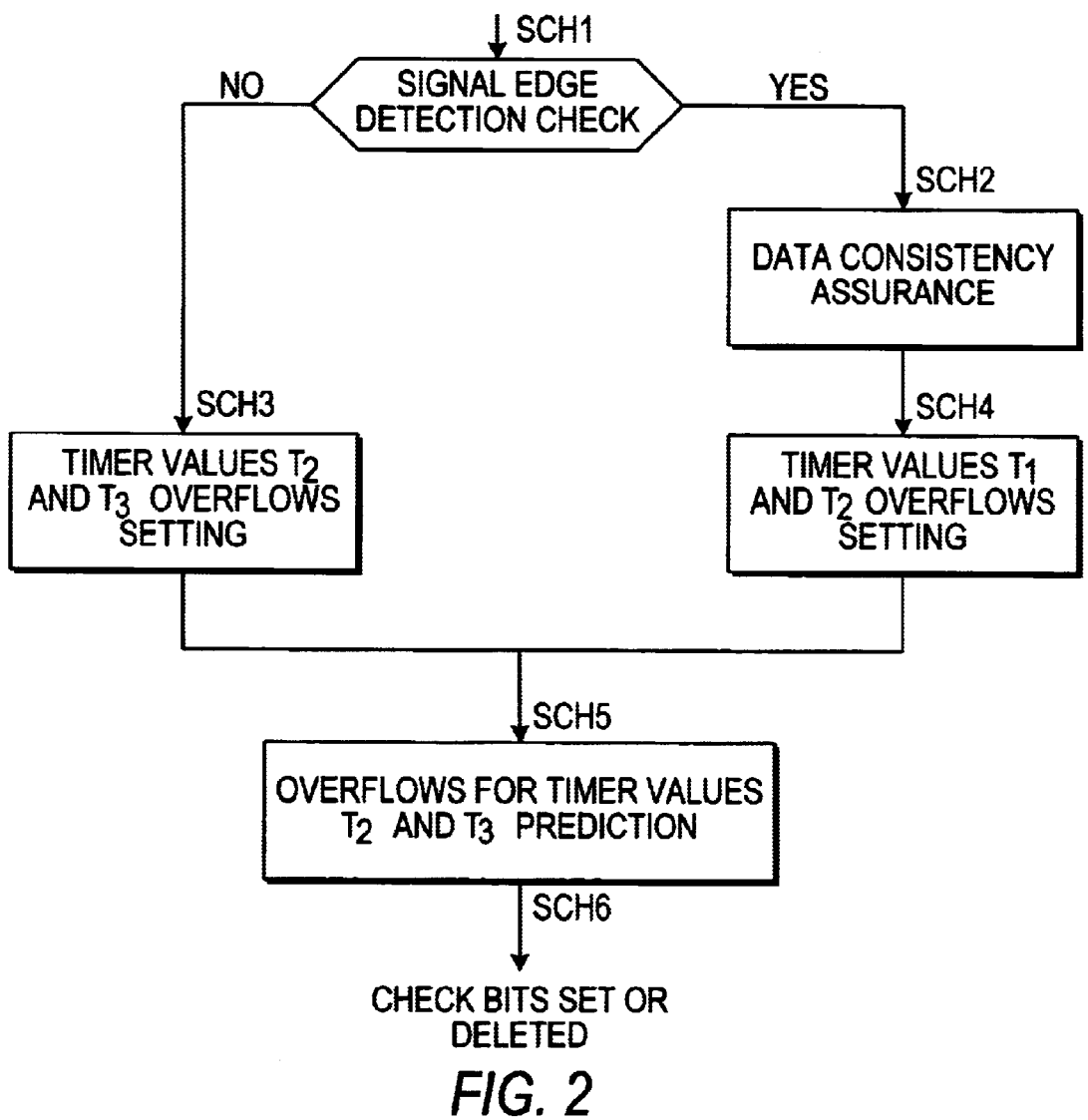

The basic-concept of the invention is comprised of the fact that the two bits required for representing longer times are realized by means of an increased effort in the software. To that end, a method for signal evaluation according to the invention is executed. If the speed is to be determined from the difference between the last timer value and the third-to-last timer value, then it is necessary that all three overflows of the timer value differences be precisely determined and taken into account in the determination of the wheel speeds. It is then possible to measure the wheel speed down to 0.5 km/h without having to replace the 16 bit timer with an 18 bit timer. In addition, a much smaller RAM memory is required. Only four bits per drum store value are required, namely a check bit and 3 bits as an overflow counter. Because of the cycle time of two milliseconds, the overflow could be "missed" since the old counter value does not have to be temporarily, stored; therefore it is necessary to insert a check bit. A possible evaluation method is depicted in FIG. 2 as a structured chart of the timer value difference monitoring. The meanings of the individual timer values are as follows:

T1=timer value of the third-to-last edge of the signal S1
T2=timer value of the penultimate edge of the signal S1
T3=timer value of the last edge of the signal S1

In step SCH1 of the method according to FIG. 2, a check is carried out as to whether a signal edge is detected. If this is the case, the data consistency is assured in step SCH2. All overflows are re-stored and a re-storage of all overflow check bits takes place.

If an edge is not detected in step SCH1, then the overflows for the timer values T2 and T3 are set in step SCH3. In addition, a suspicion of an overflow is tested and a check is carried out as to whether this suspicion has been confirmed. If this is the case, then the overflow counter is increased and the remaining check bits are deleted.

In step SCH4, the overflows for the timer values T1 and T2 are set. Furthermore, the suspicion of an overflow is tested and if it is confirmed, the overflow counter is increased and the check bits are deleted.

Steps SCH3,and SCH4 are followed by step SCH5, in which a prediction, i.e. a forecast, of the overflows for the timer values T2 and T3 is made. A test is carried out as to whether overflows of the timer value differences are to be expected in the next two milliseconds. If this is the case, then check bits are set; if this is not the case, then check bits are deleted (step SCH6).

In principle, the proposal is independent of the limiting of the timer to 16 bits, which is given by way of example. The method described can be used to expand the function of all limited timers (16 bit timers, 18 bit timers, n bit timers). This also applies correspondingly to the number of overflow bits. Depending on the desired design, a larger or smaller number of overflow bits are used.

All of the numbers or values given as examples:
16 bit timer
3 bit overflow counter for a corresponding 18 bit timer
counter value of 65 535 corresponds to 116.5 milliseconds
depend on a particular implementation. The method according to the invention can also be applied to other values.

For example, the drum store used is a magnetic layer memory with a cylindrical surface which has various tracks on its surface. Each track is associated with a magnetic head for writing and reading. With a drum store of this kind, for example six bytes can be represented and therefore three timer values can be stored.

What is claimed is:
1. A method of signal evaluation with a microcontroller, comprising the steps of processing a signal by the micro- controller which has, at least one-bit timer, a storage means; determining distances between predeterminable edges so that upon an occurrence of predeterminable signal edges timer values are input into the storage means and stored and differences between the predeterminable timer values are calculated; providing the storage means with a drum store that has at least 6 byte capacity, so that three timer values can be stored in the drum store; precisely determining overflows of all three timer value differences, when there is an overflow of at least one timer; taking into account numerical values obtained in determination of distances between the predeterminable signal edges; executing a signal evaluation respectively for similar signal edges; calculating a difference between a last timer value and a third-to-last timer value; converting the differences into a speed; setting a check bit with an expected overflow for the least one timer; deleting check bit and increasing a relevant overflow counter, when an overflow is detected; and occurring a processing in such a way that only four bits per drum store values are required, including a check bit and three bits as an overflow counter.

2. A method of signal evaluation with a microcontroller, comprising the steps of processing a signal by the microcontroller which has, at least one-bit timer a storage means; determining distances between predeterminable edges so that upon an occurrence of predeterminable signal edges timer values are input into the storage means and stored and differences between the predeterminable timer values are calculated; providing the storage means with a drum store that has at least 6 byte capacity, so that three timer values can be stored in the drum store; precisely determining overflows of all three timer value differences, when there is an overflow of at least one timer; taking into account numerical values obtained in determination of distances between the predeterminable signal edges; executing a signal evaluation respectively for similar signal edges; calculating a difference between at least timer value and a third-to-last timer value; converting the differences into a speed; and in order to monitor time value differences, carrying out in one step (SCH1) a test as to whether a signal edge has been detected; if a determination is made than an edge has been detected in step (SCH1), then in a second step (SCH") assuring a data consistency and restoring all overflows and all overflow check bits; setting the overflows for the timer value of a third-to-last edge (T1) and a penultimate edge (T2) in a step (SCH4); if an edge has not been detected in step (SCH4); if an edge has not been detected in step (SCH1) then setting the overflows of the timer values of the penultimate (T2) and the last edge (T3) in a step (SCH3); and in the step (SCH5), making a prediction as to the overflows for the timer values in of the penultimate edge (T2) and the timer value of the last stage (T3).

* * * * *